United States Patent
Lang et al.

(10) Patent No.: US 9,164,846 B2
(45) Date of Patent: Oct. 20, 2015

(54) RESTARTING A SOFTWARE SYSTEM

(71) Applicant: INTERNATIONAL BUSINESS MACHINES CORPORATION, Armonk, NY (US)

(72) Inventors: Jakob C. Lang, Stuttgart (DE); Angel Nunez Mencias, Stuttgart (DE); Albert Schirmer, Dettenhausen (DE); Jochen Schweflinghaus, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 13/873,985

(22) Filed: Apr. 30, 2013

(65) Prior Publication Data

US 2013/0346797 A1    Dec. 26, 2013

(30) Foreign Application Priority Data

Jun. 26, 2012    (GB) .................................. 1211276.9

(51) Int. Cl.
*G06F 11/00* (2006.01)
*G06F 11/14* (2006.01)
*G06F 11/07* (2006.01)

(52) U.S. Cl.
CPC ........ *G06F 11/1441* (2013.01); *G06F 11/0736* (2013.01); *G06F 11/0778* (2013.01); *G06F 11/1412* (2013.01); *G06F 11/1438* (2013.01)

(58) Field of Classification Search
CPC . G06F 11/1412; G06F 11/14; G06F 11/0793; G06F 11/1469

USPC .................................................... 714/15, 38.1
See application file for complete search history.

(56) References Cited

U.S. PATENT DOCUMENTS

| | | | |
|---|---|---|---|
| 6,681,348 B1 * | 1/2004 | Vachon ........................... | 714/45 |
| 7,376,864 B1 * | 5/2008 | Hu et al. ....................... | 714/6.13 |
| 7,818,616 B2 * | 10/2010 | Kathail et al. .................. | 714/15 |
| 8,726,092 B1 * | 5/2014 | Gray et al. .................... | 714/38.1 |
| 2005/0050389 A1 * | 3/2005 | Chaurasia ....................... | 714/15 |
| 2005/0210077 A1 * | 9/2005 | Balakrishnan et al. ........ | 707/200 |
| 2007/0162779 A1 | 7/2007 | Downer et al. | |

(Continued)

FOREIGN PATENT DOCUMENTS

| | | | |
|---|---|---|---|
| CN | 101308471 A | 5/2008 | |
| EP | 0683456 A1 | 12/1990 | |
| EP | 2280348 A1 * | 2/2011 | ............. G06F 11/14 |

OTHER PUBLICATIONS

"Core Dump," http://en.wikipedia.org/w/index.php?title=Core &dump&oldid=483346723, pp. 1-4, downloaded from internet Mar. 15, 2013.

*Primary Examiner* — Yolanda L Wilson
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

In one aspect, a technique for restarting a software system on a computer platform after an unintentional software system shutdown. The technique includes, for instance, generating a core dump file on the computer platform when the software system shuts down unintentionally, restarting the software system, using a library for copying software system related data from the core dump file to the software system, and continuing execution of the software system.

18 Claims, 6 Drawing Sheets

(56) References Cited

U.S. PATENT DOCUMENTS

| | | | |
|---|---|---|---|
| 2007/0162785 A1* | 7/2007 | Downer et al. | 714/15 |
| 2009/0031166 A1* | 1/2009 | Kathail et al. | 714/4 |
| 2010/0223498 A1* | 9/2010 | Schlesinger et al. | 714/15 |
| 2011/0035618 A1* | 2/2011 | Jann et al. | 714/3 |
| 2012/0137183 A1* | 5/2012 | Benedek et al. | 714/48 |
| 2012/0166893 A1* | 6/2012 | Chen et al. | 714/57 |

* cited by examiner

RESTARTING A SOFTWARE SYSTEM

PRIOR FOREIGN APPLICATION

This application claims priority from United Kingdom patent application number 1211276.9, filed Jun. 26, 2012, which is hereby incorporated herein by reference in its entirety.

BACKGROUND

One or more aspects of the present invention relate in general to data processing systems, and in particular, to restarting a software system on a computer platform after an unintentional software system shutdown.

Computers and software applications are often unexpectedly shut down for a variety of reasons. A power outage may cause a computer and any applications presently in use to shut down. An operating system or software application may perform an unintentional shut down ("crash") where some aspect of data being processed or some aspect of processing sequencing in the operating system or application becomes problematic and causes the operating system or application to shut down. On the other hand, often a computer or software application shutdown is intentional, but still unexpected or unintentional to the user. For example, while the user is away from the computer, a computer system administrator may load a software patch (update or other software modification) to one or more applications currently in use, followed by a restart of the computer for properly integrating the patch with the subject application.

Such intended or unintentional shutdowns and restarts often cause a loss of data being entered or edited by a user at the time of the shutdown, and moreover, such shutdowns and restarts often result in a loss of the current application state of the various applications in use at the time of the shutdown and subsequent restart. That is, the number of applications deployed, the locations on the display screen of the various application display frames, the deployment of particular documents or other data, the editing locations in deployed documents, and other application settings states are lost. After the shutdown and subsequent restart, the user must redeploy each application and associated document or other data, reposition and resize the application display frames for each deployed application, and redeploy each document or other data in use to a position in the document or data at which the document or data was being edited prior to the shutdown.

US 20070162785 A1 describes a method which solves the above and other problems by providing for capturing and restoring application settings states during application shutdowns and subsequent restarts. Pre-shutdown deployed user data also may be captured for redeployment after subsequent application restart. An in-use application periodically saves data representing its current state. For example, data representing the size and location of deployed application user interface components and display frames, the location of scrollbars and other displayed application components, and data representing presently displayed documents and the viewing and editing positions of presently displayed documents are stored to memory on a periodic basis.

Both application state data and user data may be automatically stored at regular intervals, for example, every 10 minutes, or alternatively, application state data and user data may be stored automatically upon the detection of an impending intended application shutdown in order to allow for redeployment of the application to the application state stored for the application prior to shutdown.

As described further in US 20070162785 A1, applications prepared to recover from an unintentional shutdown need to keep persistent state outside the program memory. Usually this is implemented as a checkpoint. This can consist, for example, in saving the state to a file. However this design implies a runtime overhead to generate the checkpoints and on the other hand checkpoints are usually outdated if the state changes continuously.

BRIEF SUMMARY

According to one aspect of the invention, a method is provided for restarting a software system on a computer platform after an unintentional software system shutdown, comprising generating a core dump file on the computer platform when the software system shuts down unintentionally, restarting the software system, using a library for copying software system related data from the core dump file to the software system and continuing execution of the software system.

In a further aspect of the invention, a data processing program is proposed for execution in a data processing system, comprising an implementation of an instruction set for performing a method as described herein when the data processing program is run on a computer.

Further, a computer program product comprising a computer usable medium including a computer readable program is provided, wherein the computer readable program when executed on a computer causes the computer to perform a method comprising generating a core dump file on the computer platform when the software system crashes, restarting the software system, using a library for copying software system related data from the core dump file to the software system and continuing execution of the software system.

Yet in a further aspect of the invention, a data processing system for execution of a data processing program comprising software code portions is provided for performing a method described herein.

BRIEF DESCRIPTION OF THE SEVERAL VIEWS OF THE DRAWINGS

Aspects of the present invention together with the other objects and advantages may best be understood from the following detailed description of the embodiments, but not restricted to the embodiments, wherein is shown in.

DETAILED DESCRIPTION

Figure 1:
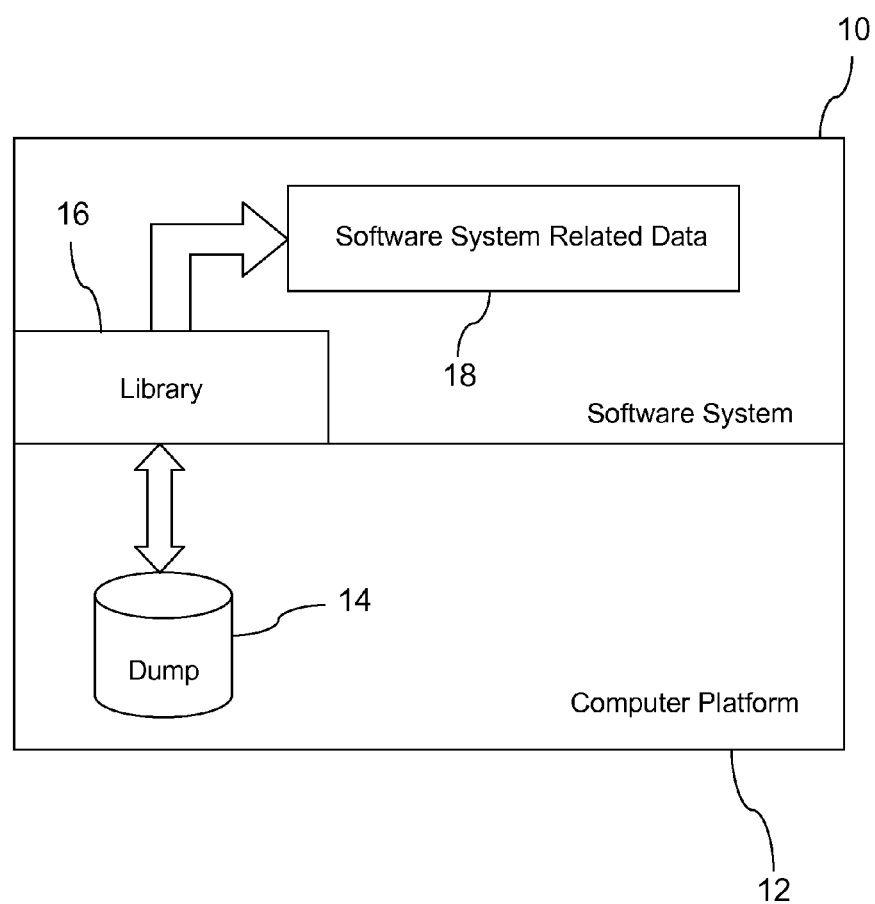
FIG. 1 an example embodiment of the invention displaying a process of restarting a software system after an unintentional software system shutdown.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

In FIG. 1 an example embodiment of the invention displaying a process of restarting a software system 10 after an unintentional software system shutdown is shown. If the software system 10, which may be an application program 42 (FIG. 4), shuts down unintentionally, i.e. crashes, it will be dumped by the computer platform 12 to a core dump file 14. Afterwards the software system 10 will be restarted by the computer platform 12. A library 16 being part of the software system 10 will then be used to check for a core dump file 14. If there is no valid core dump file 14 available, the initialization of the software system 10 will continue with the normal procedure. If there is a valid core dump file 14 available, the existing software system related data 18 will be copied from the core dump file 14 via the library 16 into the software system 10 and the execution of the software system 10 will continue.

Figure 2A:
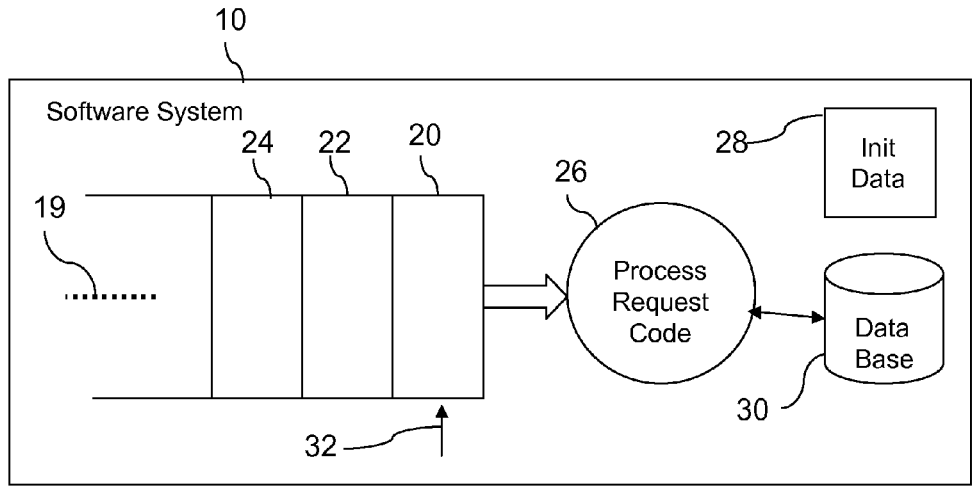
FIG. 2a a software system processing multiple consecutive requests in a request queue according to an example embodiment of the invention before an unintentional software system shutdown.

In FIG. 2a a software system 10 processing a multitude of consecutive requests 20, 22, 24, . . . in a request queue 19 according to an example embodiment of the invention before an unintentional software system shutdown is shown. Several requests 20, 22, 24, . . . are queued in a request queue 19 in order to be processed by a process module 26 of the software system 10 using software system related data 18 (FIG. 1) from a data base 30, the requests 20, 22, 24, . . . being part of, as well as using data for software system initialization 28 ("init data" in the Figure). The current position of a pointer 32 of the software system 10 is pointing to request 20 being processed at the current state of the software system 10.

Figure 2B:
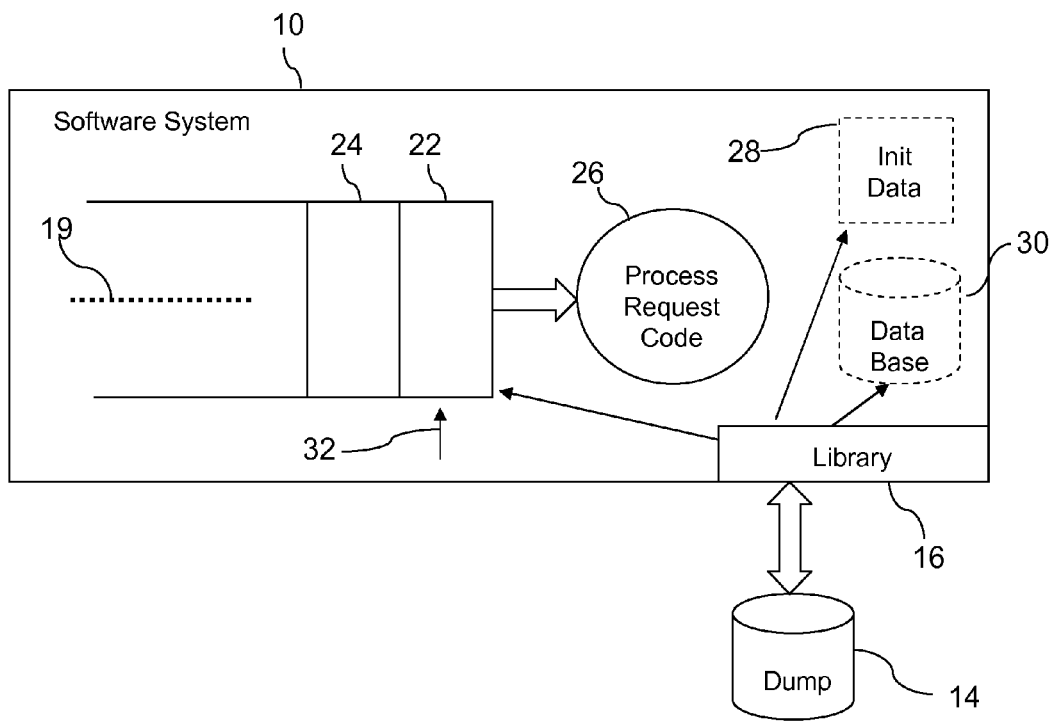
FIG. 2b the software system of FIG. 2a processing multiple consecutive requests in a request queue according to an example embodiment of the invention after an unintentional software system shutdown.

In FIG. 2b a state of the software system 10 of FIG. 2a processing a multitude of consecutive requests 22, 24, . . . in a request queue 19 is shown after an unintentional software system shutdown. The software system 10 is restarted using information from a core dump file 14 via a library 16 to initiate the software system 10 after the unintentional software system shutdown. Restart of the software system 10 may not be performed fully automatically, but alternatively delayed until fixed software system code is available. The library 16 is checking for software system related data 18, as e.g. request 20, 22, 24, . . . , and a pointer position 32, as well as for data for software system initialization 28 from the state before the unintentional software system shutdown in the core dump file 14. The software system 10 will then be restarted in the state it was at the moment of the unintentional software system shutdown. This may be achieved by retrieving the state of the software system 10 at the unintentional software system shutdown from the pointer position 32. If this was in the state of request 20 (FIG. 2a), as indicated by the pointer position 32 in FIG. 2a, then it will be restarted with this request 20. If at the restart of the software system 10 with this request 20 a failure is detected, which means that the software system has shut down unintentionally at least twice at the same request and the succeeding requests 22, 24 do not depend on results from the request 20, the software system 10 will continue execution with the next request 22 in the request queue 19. Then a user will be informed about skipping the failing request 20. For detection of a possible failure in request 20 a consistency check of the software system 10 with the software system related data 18 may be used. Alternatively to the consistency check, processing options using a slower and/or safer processing code, as is available by many software compilers, may be used. As a further option it may also be monitored if more than one unintentional software system shutdowns occur at the same state or at the same request 20 of the software system 10. If this is the case the user will be informed too. Advantageously there can be at least some possibility that the software system 10 continues execution without any further problems if the skipped request 20 was the cause for the software system crash. If the skipped request 20 does depend on other requests 22, 24, . . . in the request queue 19, then also the depending requests 22, 24, . . . might be skipped if the software application handles requests in a transaction based manner, which means to skip all requests that belong to the affected transaction.

In addition checking for a fixing of a software system failure may be performed before restart of the software system 10. This can also be done using a consistency check as described above or using checking compiler options. This may give hints to locate software failures and fix it before restart of the software system 10. By this procedure it is possible to reduce unintentional software system shutdowns based on the same failure without any further improvements in the state operated by the software system.

Figure 3:
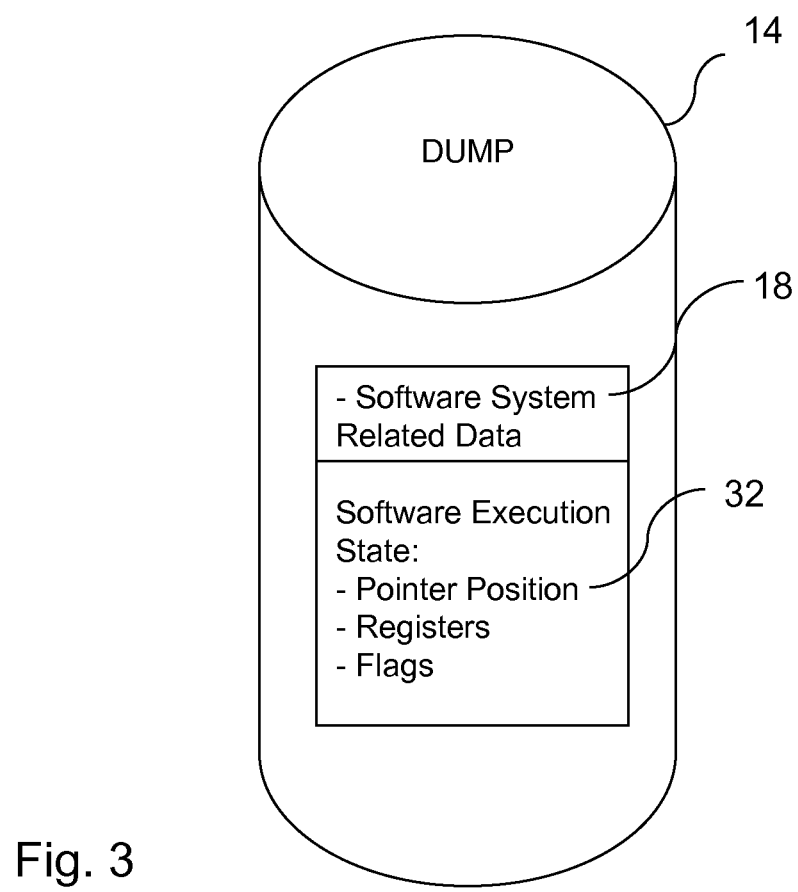
FIG. 3 typical information stored in a core dump file according to an example embodiment of the invention.

FIG. 3 depicts typical information stored in a core dump file 14 according to an example embodiment of the invention. The core dump file 14 is containing data of the software execution state with the pointer position 32 of the software system 10 at the unintentional software system shutdown occurring and software system related data 18 of the software system 10 being processed at the moment the unintentional software system shutdown is occurring.

Figure 4:
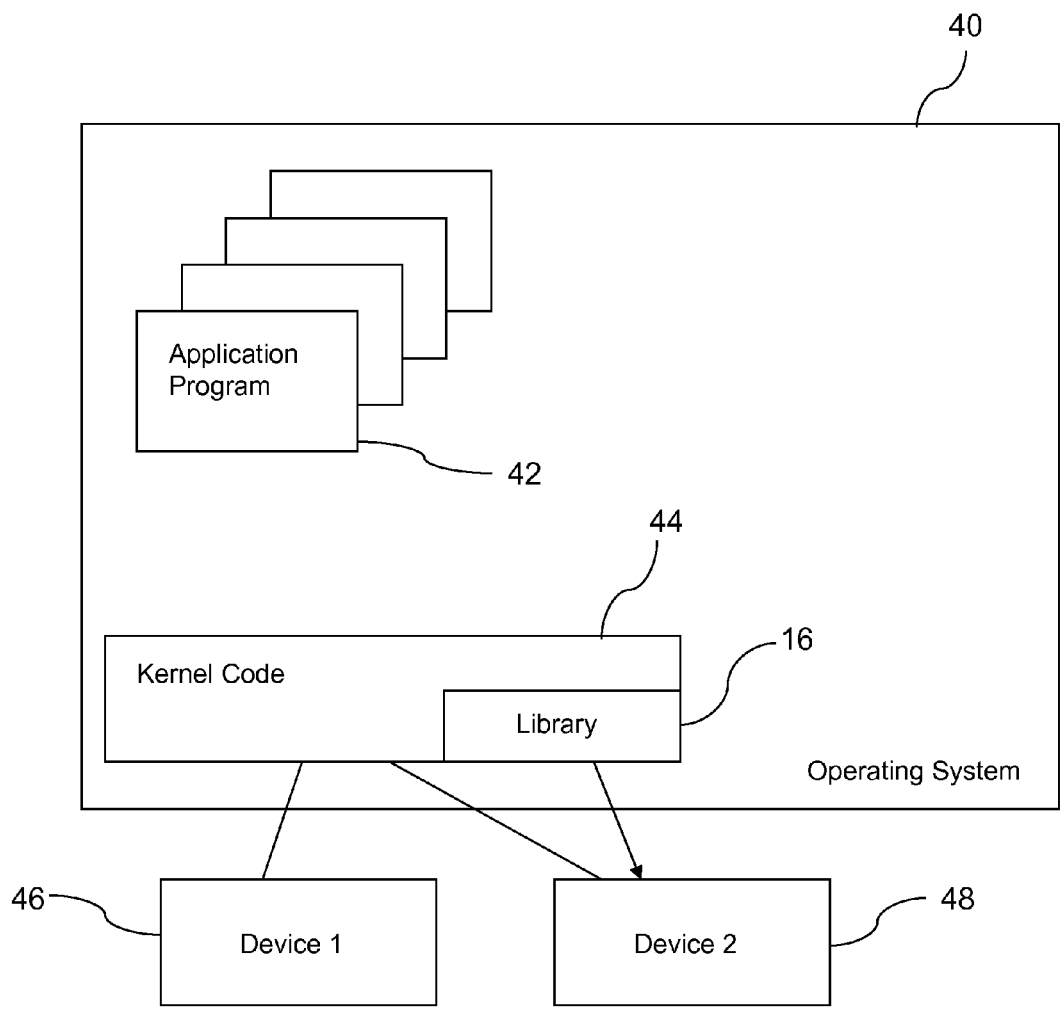
FIG. 4 an operating system prepared for restart after an unintentional software system shutdown according to an example embodiment of the invention.

FIG. 4 is showing as a further example embodiment of the invention an operating system prepared for restart after an unintentional software system shutdown. The operating system 40 includes a kernel code 44, where a library 16 is part of, and an application program 42. The kernel code 44 is operating with several external hardware devices, where two of them 46 and 48 are shown as an example in the FIG. 4. Functioning of the operating system 40 as well as of the application program 42 is depending on the functioning of the hardware devices 46 and 48. If malfunctioning of one of the hardware devices 46, 48 was the cause of an unintentional software system shutdown, then advantageously the operating system 40 will delay continuing execution until the defect hardware device 46 or 48 is fixed. Alternatively all application programs 42 may be loaded which are not depending on the defect hardware device 46 or 48. Thus continuation of the operating system 40 and the application program 42 can be ensured.

Figure 5:
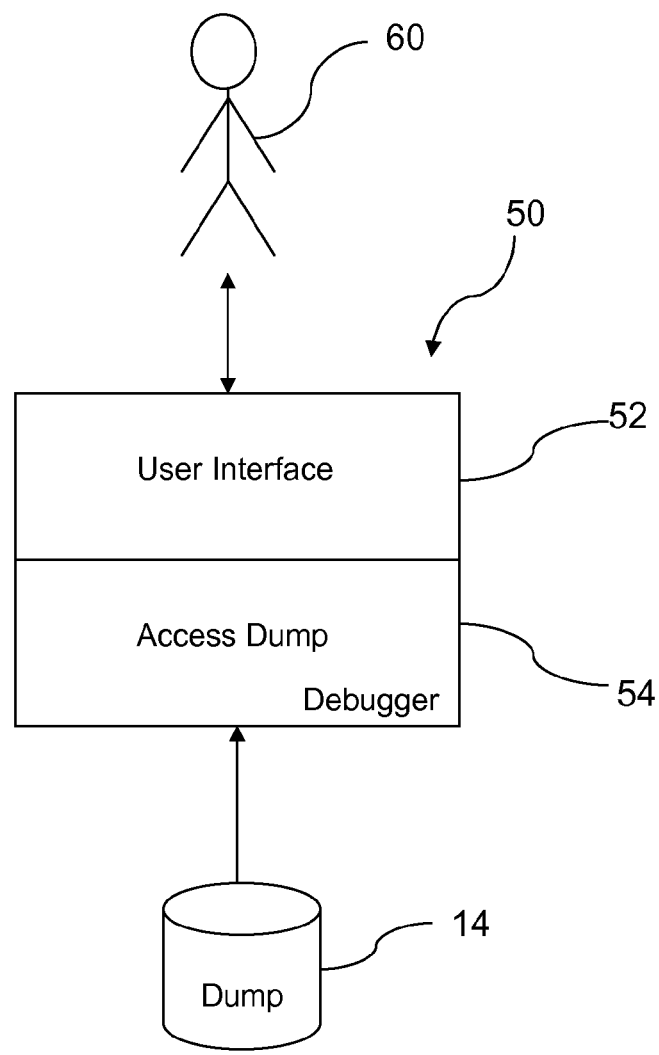
FIG. 5 a debugging system as typically used according to an example embodiment of the invention for access of core dump file data after an unintentional software system shutdown.

In FIG. 5 a debugging system 50 as typically used according to an example embodiment of the invention for access of core dump file data 14 after an unintentional software system shutdown is shown. Such a debugging system 50 includes modules 54 to access core dump files 14 as well as a user interface 52. The method described herein mainly uses the access dump module 54 because it is working automatically after an unintentional software system shutdown. The user interface 52 of the debugging system 50 serves for manual interaction of a user 60 with the debugging system 50 in order to access or check core dump file data for manual fixing or modification of the software system related data 18 or a software system 10 itself.

Figure 6:
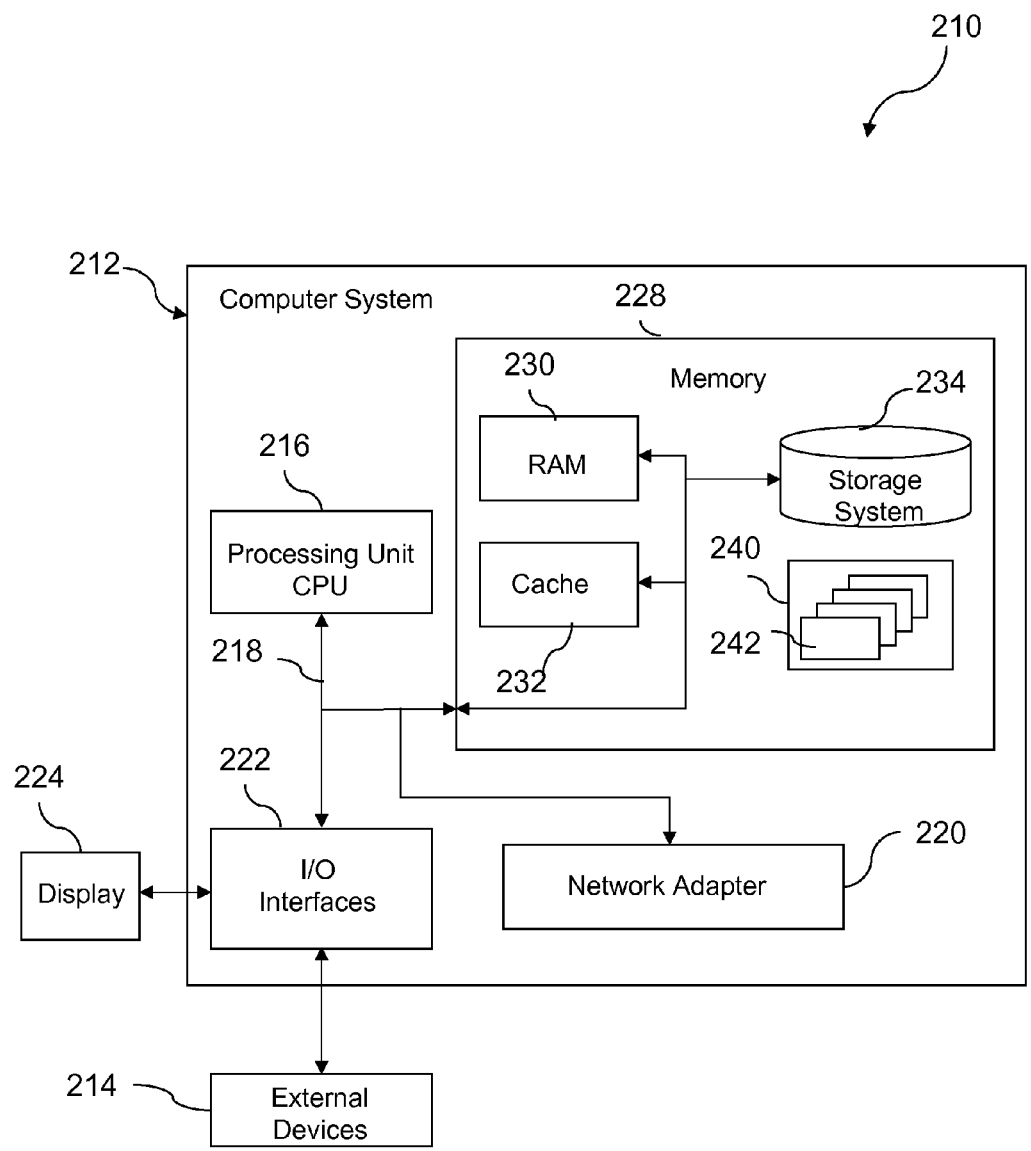
FIG. 6 an example embodiment of a data processing system for carrying out a method according to one or more aspects of the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/ server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/ non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/ Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Described above is one embodiment of a method for restarting a software system on a computer platform after an unintentional software system shutdown, and providing a recovery of the application programs or operating system while reducing runtime overhead on the computer platform.

Further, a system is provided for restarting a software system on a computer platform after an unintentional software system shutdown.

Particularly, one or more aspects address the case that the shutdown is unintentional from the user side, i.e. it may be a crash or an intended shutdown initiated from an operator side independent of the user or the like.

Favorably, manual redeployment of software system related data after restart of the software system can be reduced and information available before the software system crash can be made available at restart.

A core dump file may be used to recover the state of a software system after an unintentional software system shutdown. This may be done when the software system gets automatically restarted after an event and it reduces any additional runtime overhead.

An operating system may be configured in such a way that when a software system is shut down unintentionally, a core dump file is generated before the software system gets restarted. The core dump file can comprise, at least, a memory dump of the executable code and its data (for example, variables). At the software system restart, if a core dump file exists, it can be used to initialize the software system state.

The core dump file may comprise at least software system related data and a pointer position of the unintentional software system shutdown (i.e. software system crash). Thus the state and position of the software system at the time of shutdown, i.e. crashing, can be recorded and it may be possible to restart the software system at the position and in the state of the software system crash.

Further, one or more aspects may comprise retrieving software system related data and the pointer position using the library in order to continue execution of the software system, particularly retrieving software system related data and the pointer position using the library in order to restore the software system state to continue execution of the software system. Using a library that allows recovering the content of a variable, the software system can find out in which state the crashed software system was. Then, it can selectively extract the data used to resume operations at the previous state.

The software system can analyze the consistency of the previous state and, for example, discard corrupted or not finished operation state. Advantageously a check for consistency of the software system and the software system related data can be performed before continuing execution of the software system.

In a further embodiment, the method may comprise continuing execution of the software system at a request of a request queue where the software system crashed. If the position as well as the state of the software system can be retrieved from the core dump file using the library it is also possible to restart the software system at the request of the request queue the software system was operating on at the time of the unintentional software system shutdown. The software system then may continue directly as if no shutdown, i.e. no crash, happened.

In further aspects, checking for consistency of the software system related data in the request, monitoring the software system for unintentional shutdowns at the same request and informing a user about the monitoring results are provided. If several software system unintentional shutdowns happen at the same request there seems to be a systematic fault either in the software system itself or in the data and this should be known to the user because it might be necessary to initiate some fixing of the problem by the user himself.

In this case, continuing execution of the software system might be skipping the request, if the software system shuts down unintentionally at least twice at the same request and further requests in the request queue do not depend on the request to be skipped, and of course informing the user about skipping the request. In one aspect, there can be at least some possibility that the software system continues execution without any further problems if the skipped request was the cause for the software system crash. If the skipped request does depend on other requests in the request queue, then also the depending requests might be skipped if the software application handles requests in a transaction based manner, which means to skip all requests that belong to the affected transaction.

In one embodiment of the invention the software system can be an application program running on an operating system. Thus, if this application program shuts down unintentionally, the described technique may be used to restart the application program and continue execution of the application program.

According to another embodiment checking for a fixing of a software system failure may be performed before restart of the software system. By this procedure it is possible to reduce unintentional software system shutdowns based on the same failure without any further improvements in the state operated by the software system.

According to a further embodiment of the invention the software system may be an operating system. The described technique works because it is possible also in the case of an unintentional operating system shutdown to create a core dump file and the software system related data can be restored from this core dump file in order to be used for restarting the operating system.

In one embodiment, the method may include checking for a fixing of a hardware failure of the computer platform before restart of the software system. Often unintentional software system shutdowns occur because some hardware device is failing. In this case it would not be very helpful to restart the software system and try to use the same hardware device by the software system. Therefore it might be checked if there is some hardware failure occurring and then try to operate with a different hardware device or try to fix it before restart of the software system.

Another way of restarting a software system might be loading all parts of the software system, which are not depending on the hardware failure and continue then with the execution of the software system. By this way there exists considerable probability that the software system continues execution without further interruption by an additional unintentional software system shutdown.

In a further embodiment of the invention a debugging system may be used to retrieve software system related data from the core dump file for continuing execution of the software system. As an example a reference implementation on Linux may be used for initiating core dump files and the GNU debugger (GDB) to allow an application program to navigate the core dump file and extract the relevant state. The application program then may use the GDB advanced programming interface (API) at restart of the application program to query its variables in the core dump file.

In order to restart a software system after an unintentional software system shutdown with the one or more aspects of the technique described herein several preparation steps may be performed. For example, during a restart of the software system, the existence of a valid core dump file (e.g., valid in the sense that it has not been used already, or valid in the sense that it is in the correct format) may be checked. If this is the case, then an unintentional software system shutdown recovery procedure may be started, which can decide based upon the validity of the core dump file data, with which state it may continue operation.

Further during a software system recovery execution, a state of the software system from the core dump file data may indicate if the core dump file data may be used unchanged (if the state of the software system does not depend on the data), or if the core dump file data may be evaluated to check from which state of the software system the execution may continue, or if the software system can continue at all or must be restarted.

During the design of a software system, a design with states and state transitions may be used to identify the state of the software system at any point in time and for every state of the software system it may be defined if there is a dependency of the data itself.

Further during the execution of the software system, in a state with data dependency, the data differences to the last known valid state may be made visible with several possibilities. In data structures, those elements that have been changed may be marked. Eventually the whole data structure may be locked. A backup copy of the unchanged data structure from the last internal state may be created. Or finally for request queues the element number of the last internal state may be stored.

In one embodiment, the technique of restarting a software system after an unintentional software system shutdown may be applied too for the case, if the software system is comprising all application programs crashed during an unintentional shutdown of a whole data processing system. By this way every application program can be restarted using core dump file data according to one or more aspects of the described technique one after another until the data processing system is again in a running state. Thus, one or more aspects represent a useful instrument for the recovery of a whole data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Rash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with a computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages and also the interpreted programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The block diagrams in the figures illustrate the architecture, functionality, and operation of possible implementations of systems, methods and computer program products according to various embodiments of the present invention. In this regard, each block in the block diagrams may represent a module, segment, or portion of code, which includes one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method for restarting a software system on a computer platform after an unintentional software system shutdown, comprising:
   generating a core dump file on the computer platform when the software system in a given state shuts down unintentionally;
   restarting the software system in the given state;

using a library for copying software system related data from the core dump file to the software system;
performing a check for consistency of the software system and the software system related data; and
continuing execution of the software system.

2. The method according to claim 1, wherein the core dump file is selected to comprise at least software system related data and a pointer position of the unintentional software system shutdown.

3. The method according to claim 2, further comprising retrieving the software system related data and the pointer position using the library in order to restore a software system state to continue execution of the software system.

4. The method according to claim 1, further comprising continuing execution of the software system at a request of a request queue where the software system shuts down unintentionally.

5. The method according to claim 4, further comprising:
checking for consistency of the software system related data in the request;
monitoring the software system for unintentional shutdown at the same request; and
informing a user about the monitoring result.

6. The method according to claim 4, further comprising: performing one of:
skipping the request if the software system shuts down unintentionally at least twice at the same request and further requests in the request queue do not depend on the request to be skipped; or
skipping the request and further requests if the software system shuts down unintentionally at least twice at the same request and further requests in the request queue depend on the request to be skipped, and the software system transaction handling handles it; and
informing a user about at least one of skipping the request and further requests.

7. The method according to claim 1, wherein the software system is an application program running on an operating system.

8. The method according to claim 7, further comprising checking for a fixing of a software system failure before restart of the software system.

9. The method according to claim 1, wherein the software system comprises an operating system.

10. The method according to claim 9, further comprising checking for a fixing of a hardware failure of the computer platform before restart of the software system.

11. The method according to claim 10, further comprising loading all parts of a software system, which are not depending on the hardware failure.

12. The method according to claim 1, further comprising using a debugging system to retrieve software system related data from the core dump file for continuing execution of the software system.

13. The method according to claim 1, wherein the software system comprises all application programs shut down during an unintentional shutdown of a data processing system.

14. A computer program product for restarting a software system on a computer platform after an unintentional software system shutdown, the computer program product comprising:

a non-transitory computer readable storage medium readable by a processing circuit and storing instructions for execution by the processing circuit for performing a method comprising:
generating a core dump file on the computer platform when the software system in a given state shuts down unintentionally;
restarting the software system in the given state;
using a library for copying software system related data from the core dump file to the software system;
performing a check for consistency of the software system and the software system related data; and
continuing execution of the software system.

15. The computer program product according to claim 14, wherein the method further comprises:
continuing execution of the software system at a request of a request queue where the software system shuts down unintentionally;
checking for consistency of the software system related data in the request;
monitoring the software system for unintentional shutdown at the same request; and
informing a user about the monitoring result.

16. The computer program product according to claim 15, wherein the method further comprises:
performing one of:
skipping the request if the software system shuts down unintentionally at least twice at the same request and further requests in the request queue do not depend on the request to be skipped; or
skipping the request and further requests if the software system shuts down unintentionally at least twice at the same request and further requests in the request queue depend on the request to be skipped, and the software system transaction handling handles it; and
informing a user about at least one of skipping the request and further requests.

17. A computer system for restarting a software system on a computer platform after an unintentional software system shutdown, the computer system comprising:
a memory; and
a processor in communications with the memory, wherein the computer system is configured to perform a method, said method comprising:
generating a core dump file on the computer platform when the software system in a given state shuts down unintentionally;
restarting the software system in the given state;
using a library for copying software system related data from the core dump file to the software system;
performing a check for consistency of the software system and the software system related data; and
continuing execution of the software system.

18. The computer system according to claim 17, wherein the method further comprises:
continuing execution of the software system at a request of a request queue where the software system shuts down unintentionally;
checking for consistency of the software system related data in the request;
monitoring the software system for unintentional shutdown at the same request; and
informing a user about the monitoring result.

* * * * *